United States Patent [19]

Shuler

[11] 4,262,971
[45] Apr. 21, 1981

[54] TRACK CHAIN ASSEMBLY WITH INTEGRAL PIN AND LINK

[75] Inventor: James R. Shuler, Eureka, Ill.

[73] Assignee: Caterpillar Tractor Co., Peoria, Ill.

[21] Appl. No.: 21,137

[22] Filed: Mar. 16, 1979

[51] Int. Cl.³ .............................................. B62D 55/20
[52] U.S. Cl. ........................................ 305/14; 305/39; 305/54; 403/152; 474/223
[58] Field of Search .................. 305/11, 53, 58 R, 54, 305/39, 14; 74/248, 249, 252 C, 257; 403/152, 326, DIG. 6; 474/91, 224, 223

[56] References Cited

U.S. PATENT DOCUMENTS

| T978,007 | 1/1979 | Livesay | 305/39 |
|---|---|---|---|
| 1,293,606 | 2/1919 | Young | 305/53 X |
| 2,598,828 | 6/1952 | Phelps | 305/11 |
| 3,601,454 | 8/1971 | Reinsma | 305/11 |
| 3,628,834 | 12/1971 | Anderson | 74/249 X |
| 3,829,173 | 8/1974 | Stedman | 305/11 |
| 4,150,856 | 4/1979 | Hakkenberg et al. | 305/58 R X |

Primary Examiner—Charles A. Marmor

Attorney, Agent, or Firm—Wegner, Stellman, McCord, Wiles & Wood

[57] ABSTRACT

A track chain construction (10) wherein a pair of link chains (11 and 12) are maintained in spaced parallel relationship by shoes (13) secured to the respective links (16,17) of the link chains. The shoes define central lugs (18) for engagement by the drive sprocket in operating the track chain. Each link (16,17) defines an integral unitary structure including a socket portion (23) and a pin portion (24). The pin defines a reservoir (27) for containing lubricating oil for lubricating the pivot joint defined by the pin (24) received in the socket bore (23). A crescent seal (36) defines a moving seal for cooperation with a fixed seal (30,31) between an end cap (29) and the socket end (21) of the link for sealingly maintaining the oil against leakage from the pivot joint (20). A removable plug (28) permits recharging the oil reservoir (27) when desired. The seal (36) includes an improved wear member (42) adhesively bonded to the pin (24) and defining the surface against which one leg (41) of the seal movably engages. Structure (33,34) is provided for limiting the axial movement of the pin (24) relative to the socket (23).

10 Claims, 4 Drawing Figures

TRACK CHAIN ASSEMBLY WITH INTEGRAL PIN AND LINK

TECHNICAL FIELD

This invention relates to track chain constructions and in particular to track chain constructions for use in track propelled vehicles.

BACKGROUND ART

It has been conventional in track chain constructions to utilize coaxial pins and bushings extending between the parallel track chain adapted to have meshing engagement with the sprocket of the tractor drive so as to propel the tractor by means of the track assembly. Such construction required fixation of the ends of the bushing in the opposite track chain links and problems have arisen from time to time in maintaining the securing of the bushing ends therein. Further, the pins which provide the articulation of one link to the other in the track chain assembly have presented problems in requiring lubrication and maintain axial positioning. Further, the use of such pin and bushing sprocket means has caused the weight of the track chain construction to be relatively large.

An example of an improved cartridge joint for a heavy duty track chain having fork and blade-type track links and a midpitch drive lug is shown in U.S. Pat. No. 3,601,454 of Harold L. Reinsma, which patent is owned by the assignee hereof. The use of the cartridge joint produced greater strength in the connection of the links at a reduced cost and permitted facilitated replacement in the field.

In U.S. Pat. No. 3,829,173, which patent is owned by the assignee hereof, Robert N. Stedman disclosed a track assembly utilizing fork and blade-type links pivotally mounted together by a tubular pin and a pair of annular bearings. The assembly includes an annular seal and a retaining means disposed on the outboard side of the bearings.

DISCLOSURE OF INVENTION

The present invention comprehends an improved track chain construction for use in a track propelled vehicle or the like wherein the links are provided at on end with an integral laterally projecting pin and at the other end, with a socket portion for receiving the pin of the adjacent link. The links are arranged in a series with the pin of each link pivotally received in the socket portion of the preceding link.

Means may be provided for preventing axial displacement of the pins from the socket portions.

In the illustrated embodiment, the pin comprises a cylindrical element welded to one end of the link. The pin may comprise a tubular element defining internally an oil reservoir for use in retaining lubricant oil in lubricating the pivotal joint defined by the pin and socket portion.

Improved sealing means may be provided for retaining the lubricant oil in the socket portion so as to provide long, troublefree life of the track joint construction.

The axial displacement preventing means may comprise cooperating shoulders on the confronting link end portions, and in the illustrated embodiment, one of the shoulder means may comprise a snap ring providing a removable collar structure therein.

The track chain construction may include a pair of link chains defined by the plurality of pivotally connected links, as discussed above, with a plurality of shoes extending laterally therebetween and provided with center lugs for use in driving the track chain assembly.

The improved sealing means includes a C-shaped seal in a seal spaced defined by cooperating portions of the links. A wear member may be bonded to one of the link portions so as to provide a wear surface for one leg of the seal, thereby effectively minimizing the cost of the sealing means while yet providing a long troublefree life thereof.

The track chain construction of the present invention is extremely simple and economical while yet providing an improved long, troublefree life and effectively minimized maintenance, as discussed above.

BRIEF DESCRIPTION OF DRAWINGS

Other features and advantages of the invention will be apparent from the following description taken in connection with the accompanying drawing wherein.

BEST MODE FOR CARRYING OUT THE INVENTION

Figure 1:
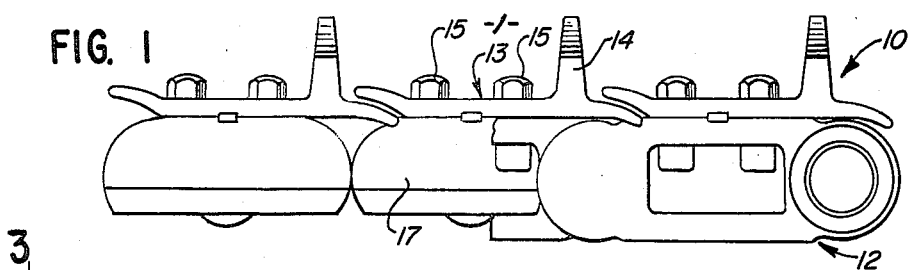
FIG. 1 is a side elevation of a portion of the track chain construction embodying the invention.
Figure 3:
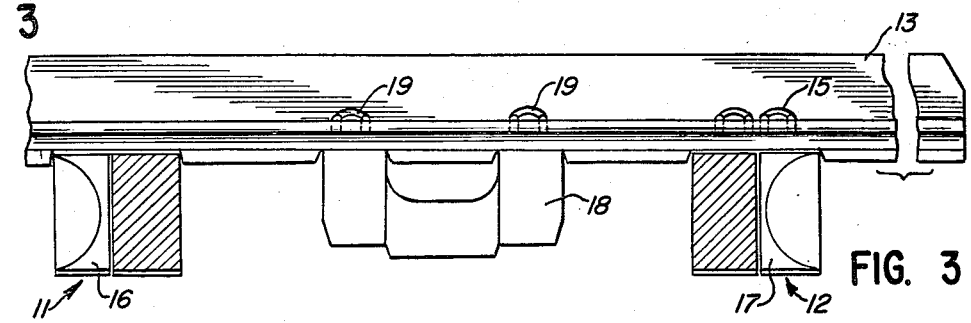
FIG. 3 is a transverse vertical section of the track chain construction.

In the exemplary embodiment of the invention as disclosed in the drawing, a track chain construction generally designated 10 is shown for use as in a track propelled vehicle or the like. The construction includes a pair of parallel extending link chains 11 and 12 maintained in parallel spaced relationship by a plurality of shoes 13, each provided with an upstanding cleat 14 for use in propelling the vehicle by suitable engagement with the underlying ground surface. As shown in FIGS. 1 and 3, the shoes 13 are secured to the respective link chains by suitable bolts 15. As is conventional in such track chain constructions, one shoe is bolted to a pair of spaced links 16 and 17. Each shoe is provided at its midportion with a lug 18 which may be secured thereto by suitable bolts 19 to define the means for engaging the vehicle drive sprocket in effecting the desired movement of the track chain construction in propelling the vehicle.

Figure 2:
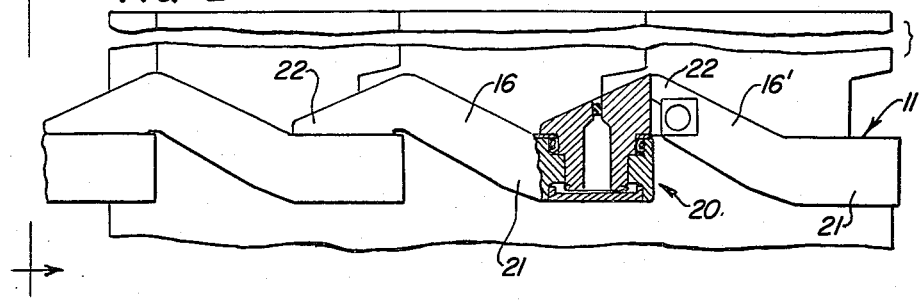
FIG. 2 is a fragmentary plan view thereof with a portion broken away for facilitating illustration of the pivot joint defined by the pin and socket portions of the respective links.

The present invention comprehends the use of an improved pivot joint generally designated 20 for interconnecting the respective links of the link chains 11 and 12. Thus, as shown more specifically in FIGS. 2 and 4, the pivot joint defines means for interconnecting successive links, such as links 16 and 16', in the respective link chains. As shown, each link defines a forward end portion 21 and a rearward end portion 22. The forward end portion effectively defines a socket 23 pivotally receiving a pin 24 defined by the rearward end portion 22 of the next link. The invention comprehends that the pin 24 comprise an integral laterally projecting portion of the rear portion 22 of the link so that each link effectively comprises a one-piece element having, at one end, a pin socket and at the other end, a pin permitting the respective links to be arranged in series connection to define the desired track chain.

Figure 4:
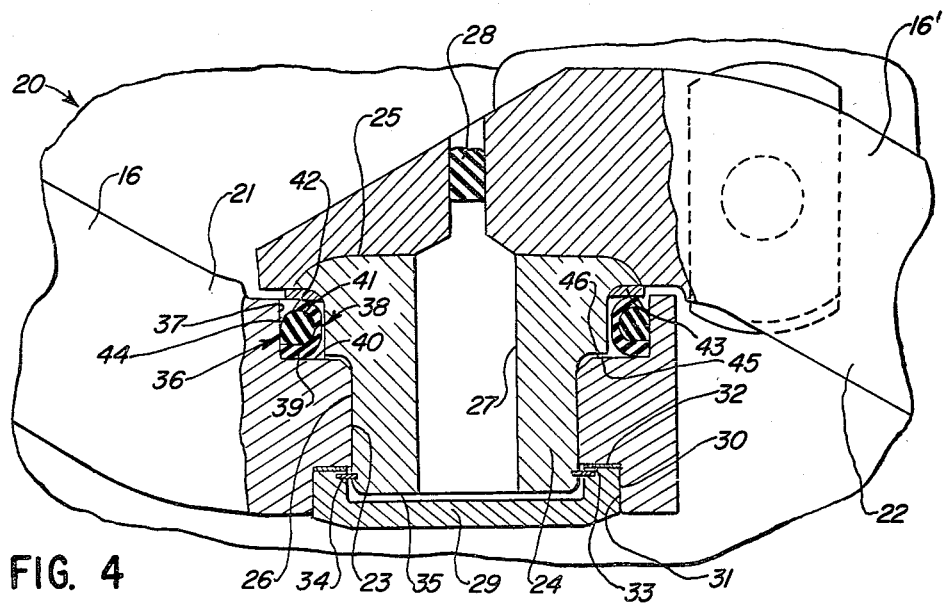
FIG. 4 is a fragmentary enlarged plan view shown partially in section illustrating in greater detail the pivot joint construction of the track chain.

In the illustrated embodiment, the pin 24 comprises an element secured to the link portion 22 by suitable weld means 25. As shown in FIG. 4, the socket 23 may comprise a cylindrical bore in the link end portion 21 and the pin may define a complementary cylindrical surface 26 rotatably fitted in bore 23 to provide a pivotal connection between the successive links.

As further shown in FIG. 4, the pin 24 may define a central, or axial, bore 27 which may be closed at one end by a plug 28 in the link portion 22. Bore 27 effectively defines a lubricant reservoir for maintaining a body of lubricant for lubricating the pivot surface 26 in socket bore 23 thereby to provide long, troublefree life of the pivot joint 20.

The outer end of socket 23 may be sealingly closed by a cap 29 having a cylindrical outer surface 30 fitted in a complementary cylindrical recess 31 in the end portion 21 of the link defining socket 23. An annular gasket 32 may be provided between the cap and a radial surface 33 of the link portion 21 at the inner end of recess 31 to cooperate with the fitted engagement of surface 30 with the recess surface 31 in sealing the cap to the link portion 21 when the cap is installed, as shown in FIG. 4.

Axial movement between the pin 24 and socket 23 may be limited by a suitable snap ring 34 mounted in a suitable groove in pin 24 with the inward movement of the pin being limited by the abutment of the snap ring 34 with surface 33.

As shown in FIG. 4, the distal end 35 of the pin 24 may be spaced inwardly of the cap 29 so as to permit lubricant to flow from the reservoir bore 27 to the space between pin surface 26 and socket surface 23, thereby to lubricate the pivot joint in the use of the track. The lubricant is prevented from passing outwardly from this space by means of a seal generally designated 36 comprising an annular crescent seal received in a suitable seal space 37. The crescent seal is defined by a C-shaped member generally designated 38 having a first leg 39 sealingly engaging a surface 40 on the link portion 21, and a second leg 41 sealingly engaging a wear member 42 associated with the pin 24. In the illustrated embodiment, wear member 42 comprises a washer, which may comprise a hardened metal washer, adhesively bonded to the pin. The surface 43 of the washer, against which seal leg 41 bears, may be accurately machined so as to provide an improved sealing surface accommodating the pivotal movement of the pin in the socket. The seal legs 39 and 41 are urged sealingly against the confronting surfaces by a load ring 44. Thus, lubricant is prevented from loss inwardly from the space between surfaces 23 and 26, while yet free pivotal movement of the pin 24 in the socket may be had.

INDUSTRIAL APPLICABILITY

Thus, the invention comprehends an improved track chain construction for use in track propelled vehicles and the like. The track chain construction is advantageously adapted for use on wide track shoes as the construction effectively minimizes the weight of the track chain while yet effectively preventing twisting and bending of the track components.

The chain construction utilizes a center drive lug for engagement with the drive sprocket of the conventional tractor drive means.

The track shoes are utilized in the track chain construction of the present invention to maintain the desired spaced association of the two link chains at the opposite ends of the shoes, thus effectively minimizing the weight of the assembly. Further, by utilizing integral pin and socket means as unitary construction link elements, the same structure may be utilized for both the left and right side link chains and each link is identical to each of the other links in the entire track chain construction.

Further, the improved track chain construction utilizes only a single moving seal, such as seal 36, further effectively minimizing maintenance and assuring long, troublefree life of the construction.

The use of the end cap in providing a stationary seal with one end of the respective links is generally similar to the construction shown in copending L. E. Fox et al. application, Ser. No. 899,771, now issued as Pat. No. 4,163,589, and owned by the assignee hereof.

The use of the wear member 42 permits a substantial economy in the provision of the moving seal 36 in that the wear member surface 43 may be economically provided as an improved smooth surface for engagement by the seal leg so as to effectively minimize wear and assure long troublefree life of the seal in the track chain construction.

Axial outward movement of the pin 24 relative to the socket 23 is prevented by the engagement of a shoulder 45 on the pin 24 with a complementary shoulder 46 on the socket end 21 of the link 16, as seen in FIG. 4. Thus, the pin 24 is effectively retained against axial displacement relative to the socket bore 23 for long, troublefree life.

As will be obvious to those skilled in the art, the unitary construction of the pin portion of the links may be effected by suitable forming of the link end or by the disclosed welded pin construction, as desired. In either case, the unitary and integral construction of each link in defining both the pin means and socket means of the track chain construction provides an improved, simplified and economical manufacture, affording substantial advantage over the prior art structures, as discussed above.

Other aspects, objects and advantages of this invention can be obtained from a study of the drawings, the disclosure and the appended claims.

What is claimed is:

1. A track chain construction (10) for use in a track propelled vehicle, said track chain construction comprising:

a plurality of links (16,17) each having opposite end portions (21,22), one end portion (22) being provided with a recess and having a cylindrical tubular element welded to said one end portion (22) in said recess to define an integral laterally projecting pin (24), and the other end portion (21) defining a socket portion (23), said tubular element defining an axial oil reservoir (27), said links being arranged in a series (11) with the pin (24) of each link (16') pivotally received in the socket portion (23) of the succeeding link (16');

means (28,30,31,36) for sealingly closing said reservoir axially inwardly and outwardly of said tubular element to retain lubricating oil therein for use in lubricating the pivot joint (20) defined by the pin (24) in said socket portion (23); and means (33,34,45,46) for preventing axial displacement of the pins from the socket portions defined by confronting axially facing shoulders (32,33,45,46) on said end portions (21,22) of the links.

2. The track chain construction of claim 1 wherein said shoulder defining means includes a removable collar (34) on one of said link end portions.

3. The track chain construction of claim 2 wherein said collar comprises a removable snap ring (34) on said pin (24).

4. The track chain construction of claim 2 wherein said removable collar (34) is on said pin (24).

5. The track chain construction of claim 1 wherein said shoulder defining means includes integral confronting surfaces (45,46) of the pivotally connected link end portions (21,22).

6. The track chain construction of claim 5 wherein said confronting surfaces (45,46) are on the pivotally connected pin (24) and socket portion (23).

7. The track chain construction of claim 5 wherein said confronting surfaces (45,46) are on the pivotally connected pin (24) and socket portion (23) and comprise a first shoulder defining means and a removable collar (34) on said pin (24) juxtaposed to a confronting surface of said socket portion (23).

8. The track chain construction of claim 1 wherein said shoulder means comprises first shoulder means (45,46) at an axially inner portion of said pin (24) and second shoulder means (33,34) at an axially outer portion of said pin (24), said pin (24) being journaled in said socket means (23) intermediate said first and second shoulder means.

9. The track chain construction of claim 1 wherein said shoulder means comprises first shoulder means (45,46) at an axially inner portion of said pin (24) and second shoulder means (33,34) at an axially outer portion of said pin (24), said pin (24) being journaled in said socket means (23) intermediate said first and second shoulder means, and said sealing means (36,30,31) is disposed axially inwardly and outwardly of said first and second shoulder means respectively.

10. A track chain construction (10) for use in a track propelled vehicle, said track chain construction comprising:

first and second pluralities of links (16,17), each having opposite end portions (21,22), one end portion (22) being provided with a recess and having a cylindrical tubular element welded to said one end portion (22) in said recess to define an integral laterally projecting pin (24), and the other end portion (21) defining a socket portion (23), said tubular element defining an axial oil reservoir (27), said links being arranged in a series (11) with the pin (24) of each link (16') pivotally received in the socket portion (23) of the succeeding link (16'), means (28,30,31,36) for sealingly closing said reservoir axially inwardly and outwardly of said tubular element to retain lubricating oil therein for use in lubricating the pivot joint (20) defined by the pin (24) in said socket portion (23), and means (33,34,45,46) for preventing axial displacement of the pins from the socket portions defined by confronting axially facing shoulders (32,33,45,46) on said end portions (21,22) of the links, said first plurality of links defining a first link chain and said second plurality of links defining a second link chain;

a plurality of shoes (13) extending laterally between said first and second link chains (11,12) to maintan said link chains in spaced parallel relationship; and lugs (18) carried by said shoes (13) for use in driving the track chain.

* * * * *